United States Patent [19]

Quanbeck

[11] 4,068,723
[45] Jan. 17, 1978

[54] FLOATING BEAM PLOW

[76] Inventor: Sherman H. Quanbeck, Aneta, N. Dak. 58212

[21] Appl. No.: 690,858

[22] Filed: May 28, 1976

[51] Int. Cl.² ............................................. A01B 61/00
[52] U.S. Cl. .................................. 172/267; 172/268; 172/269; 172/744
[58] Field of Search ............... 172/266, 267, 268, 264, 172/265, 269

[56] References Cited

U.S. PATENT DOCUMENTS

| 637,390 | 11/1899 | Howe et al. | 172/266 |
|---|---|---|---|
| 839,956 | 1/1907 | Reeves et al. | 172/266 |
| 3,321,027 | 5/1967 | Johnson et al. | 172/266 |
| 3,605,905 | 9/1971 | Bo | 172/266 X |
| 3,662,839 | 5/1972 | Thorsrud | 172/266 |
| 3,901,326 | 8/1975 | Geurts | 172/266 X |
| 3,972,374 | 8/1976 | Venable et al. | 172/266 X |

Primary Examiner—George J. Marlo
Attorney, Agent, or Firm—Dugger, Johnson & Westman

[57] ABSTRACT

A beam for supporting an earth working tool, such as a moldboard plow, which is made so that it will float vertically over obstacles that do not hook the earth working tool, and which also includes linkage that will trip to provide clearance over obstacles which cause a high resistance to floating. The unit utilizes tension springs placed to insure reliable operation, and yet which provide high holding forces for working conditions. Folding links are used to provide full tripping of the mechanism. The folding links are arranged in relation to the provided tension springs to keep spring expansion to a minimum during tripping and yet permit reliable tripping under high forces. The springs provide adequate pressure for resetting after clearing the obstacle.

17 Claims, 7 Drawing Figures

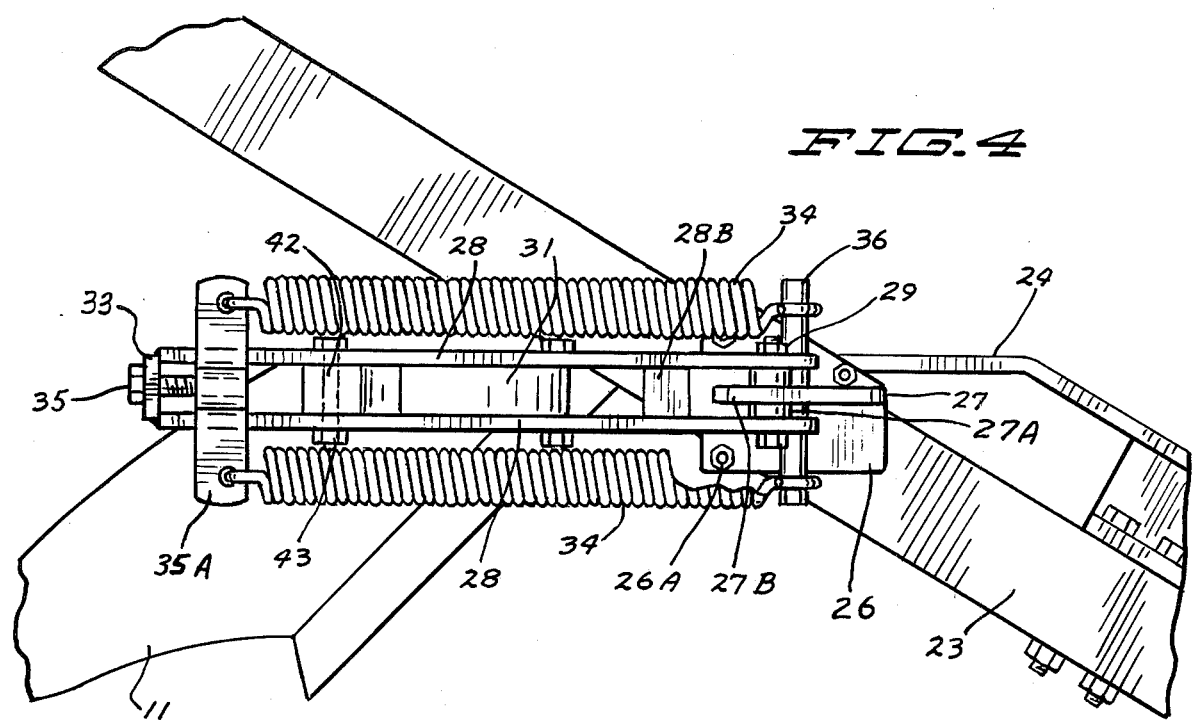
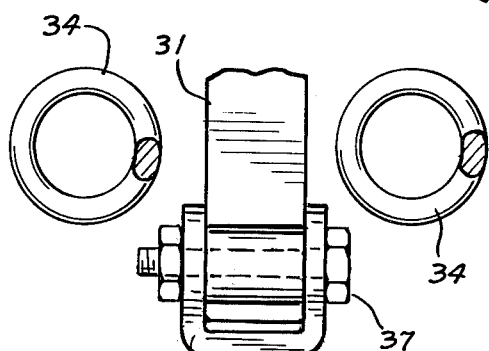
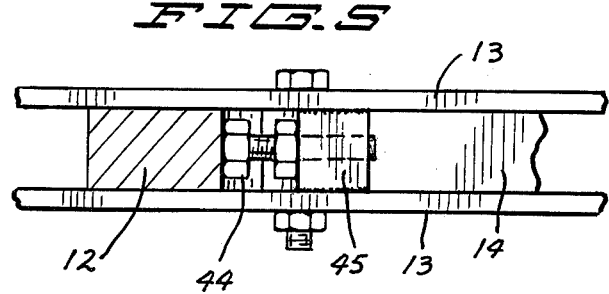
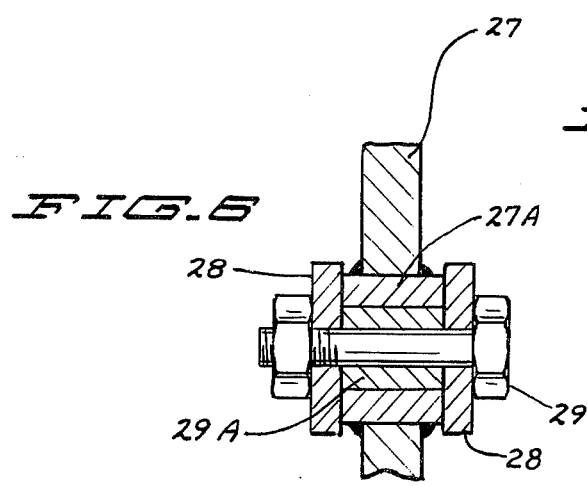
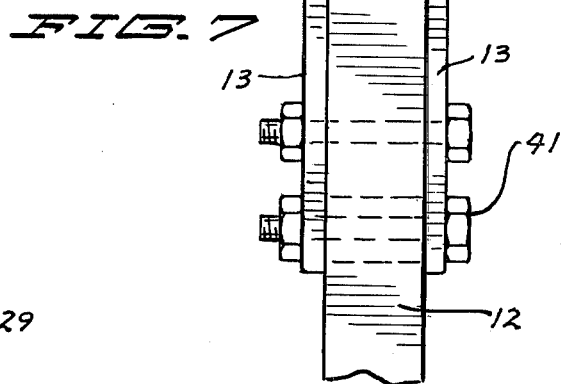

FLOATING BEAM PLOW

BACKGROUND OF THE INVENTION

1. Field of the Invention

The present invention relates to trip beam assemblies for use with earth working tools such as moldboard plows.

2 Prior Art

In the prior art relating to tripping beams, various efforts have been made to provide a plow that will float over ordinary obstacles, and will trip very high when it encounters a large obstacle, or an obstacle that tends to hook the plow bottom.

Floating plow beams that trip in two different modes, one to float over obstacles and the other for high clearance were known prior to this time. My own U.S. Pat. No. 3,052,308 shows a type of plow trip which floats over ordinary rocks in the field, and which trips for high clearance when certain obstacles were encountered.

Further improvements of this type of device include my U.S. Pat. Nos. 3,468,382 and 3,550,690.

U.S. Pat. No. 3,321,027 involves such a linkage which places great emphasis on the ability of folding links to be reset prior to the entry of the plow back to its working position. Means are specifically provided in this patent for insuring that reset occurs before the unit returns to the ground.

Another type of prior art device providing a tripping action for a cultivator shovel is shown in Canadian Pat. No. 635,406, Issued Jan. 30, 1962 to Ivor C. Rogers.

Thus, while efforts have been made to provide satisfactory plow or earth working tool operations particularly where the ground includes rocks, stumps or other obstacles, the prior art devices have had drawbacks in relation to their ability to provide reliable tripping in all types of operation as well as providing low cost manufacture.

A reliable tripping linkage, which provides high clearance when an obstacle is encountered is shown in my copending application Ser. No. 606,726, Filed Aug. 21, 1975. The present device incorporates a folding linkage arranged in a manner similar to that shown in my application Ser. No. 606,726, but by modifications, which will become apparent. The present device permits floating over smaller or rounded obstacles and in this way significantly reduces the number of times that the plow bottom must trip fully.

U.S. Pat. No. 3,565,180 shows a tripping plow, and includes a stop block with an off center hole, but it is not used in a toggle linkage.

SUMMARY OF THE INVENTION

This invention relates to a floating trip beam for earth working tools such as moldboard plows which includes a folding or toggle linkage for high clearance tripping, and includes a link and spring mounting arrangement that permits the plow bottom to float without tripping the toggle linkage to clear certain obstacles. The floating action provides high clearance for the tool in this particular device because of the arrangement of the links that mount the earth working tool. The springs utilized with the present device are tension springs that are easily adjusted as to force, and do not stretch excessively during either the floating or the tripping action.

The ability to float over obstacles is important, because if the obstacle is rounded and does not hook the earth working tool, the floating action prevents large shock loads on the plow, and consequently there is less likelihood of damage and wear to the linkage from tripping.

The unit is easily manufactured, and presents a relatively low cost device. The force required for tripping to its full trip position can easily be adjusted, and also an adjustable stop member is provided to permit adjustment or alignment of the plow bottom carried by the support.

The linkage supporting the earth working tool acts as a parallel linkage during the floating action to maintain the plow bottom oriented wtih respect to its original plowing position as the unit floats over obstacles that do not hook the bottom to cause full tripping. The plow or tool continues to operate well even while floating over obstacles. Further, if the plow bottom is hooked, the folding linkage (which forms the upper support link) will trip to permit the plow bottom to swing upwardly about a pivot out of the way of the obstacle.

In both modes of tripping the reset operation is automatic so that the plow bottom will return to its working position under spring force. When the plow is fully tripped, the resetting operation or path of movement is different from that which it follows when it is floating. In other words, the resetting of the toggle linkage once it has tripped is not completed until the plow bottom is in working position. The spring mounting does not cause reset of the toggle links prior to entry into the ground or prior to return of the plow to its working position. By permitting the plow bottom to follow two different paths for the two different tripping actions the complexity of the linkage is reduced, and makes more efficient use of the spring force available.

BRIEF DESCRIPTION OF THE DRAWINGS

FIG. 4 is a top plan view of the device of FIG. 1;

FIG. 5 is a fragmentary sectional view taken on line 5—5 in FIG. 1;

FIG. 6 is a fragmentary sectional view taken on line 6—6 in FIG. 1; and

FIG. 7 is a fragmentary rear view taken as on line 7—7 in FIG. 1.

DESCRIPTION OF THE PREFERRED EMBODIMENT

Figure 1:
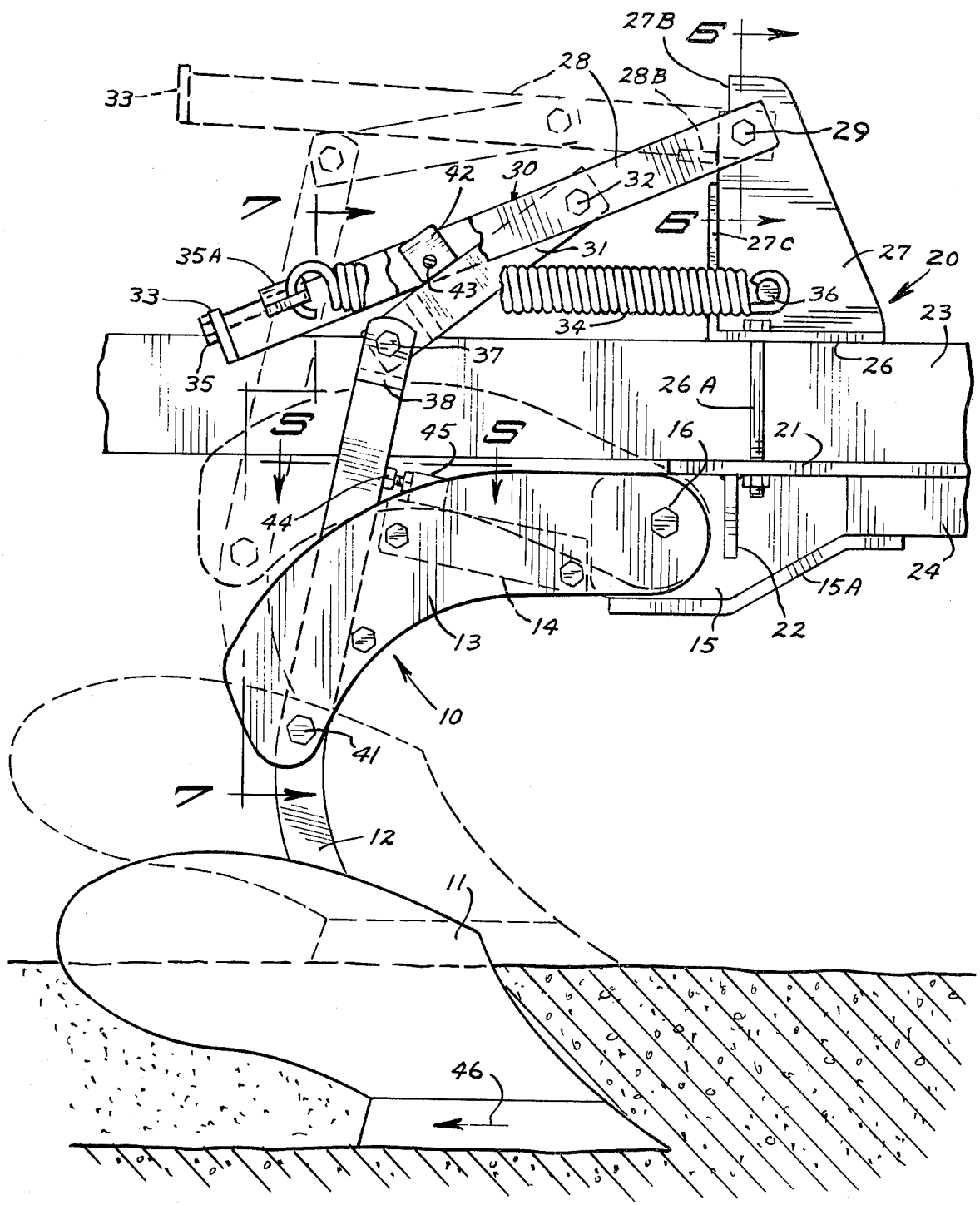
FIG. 1 is a side elevational view of a typical floating beam having a moldboard plow attached thereto and shown in solid lines in working position and in dotted lines in floating position.

An earth working tool indicated generally at 10 as shown comprises a moldboard plow having a moldboard and share 11 mounted onto a rigid shank 12. The moldboard and share are of usual construction, and the shank 12 is positioned between two curved standard plates 13. These standard plates are spaced apart to receive the shank 12, and at the forward end of the curved plates a spacer indicated at 14 can be used between the plates to keep them spaced.

The forward or upper ends of the standard plates 13 are positioned on opposite sides of a mounting bar 15 with a suitable pivot bolt 16. The pivot bolt 16 has an axis which forms the main pivot axis of the standard plates. the mounting bar 15 forms a main support for the earth working tool assembly, and is part of a support clamp assembly illustrated generally at 20. The clamp assembly 20 includes the bar 15 welded to a base plate 21, and a reinforcing lug 22 extends at right angles to the bar 15 and is welded to both the base plate 21 and the bar 15. The bar 15 is positioned underneath a box section frame support beam 23, which extends rearwardly and laterally of the plow assembly, so that it is diagonally extending with respect to the direction of travel of the plow in a normal manner.

A mounting bar 24 is welded to the bar 15, and extends forwardly therefrom, and forwardly of the clamp assembly 20 so that a standard plow coulter can be attached to the bar 24 in proper position ahead of the beam 23 (see FIG. 4). The main portion of the bar 15 is of greater vertical depth than the bar 24, to provide for a greater wearing surface area in contact with plates 13 to carry side loads from the plow moldboard and share 11 back to the plow frame.

The bar 15 can also be reinforced with a bottom member 15A that is welded to the bar 24 and the bar 15 to help carry the side loads that are present.

The bottom plate 21 can be clamped against the bottom of the plow frame beam 23 with suitable bolts that pass through the bottom plate 21 and a top plate 26. Such a bolt is shown at 26A, and additional bolts used may be seen in FIG. 4.

The top plate 26 has an upright standard or mast 27 welded thereto, and extending upwardly therefrom.

Adjacent the upper end of the mast 27 there is a pivot bolt 29, that mounts a pair of arms 28 which form a first link element of the folding or toggle link assembly 30. The arms 28 are spaced apart, and are pivotally mounted onto a bushing on the bolt 29. To adequately carry the loads on pin 29 a sleeve 27A is welded to mast 27, as seen in FIG. 6. A second rotatable bushing 29A is mounted inside sleeve 27A and the bolt 29 passes through this bushing 29A. The arms 28 form the first toggle link element and extend rearwardly as shown.

A second toggle link element 31 forming a part of the toggle link assembly 30 is pivotally mounted with a bolt 32 to the midportions of the arms 28, and is positioned between the arms as shown. The link element 31 is a solid bar link that can pivot between arms 28.

The rear portions of the arms 28, 28 extend rearwardly well past the toggle linkage pivot 32 and have a cross member 33 which is fixed to the rear ends of both of the arms. First ends of each of a pair of tension springs 34 are mounted on a bracket plate 35A. An adjustment bolt 35 threads into a threaded block fixed to the bracket plate 35A. The bolt also passes through cross member 33 and the head of bolt 35 bears against the cross member 33. The bracket plate will slide along arms 38 as the bolt 35 is adjusted and thus provides for adjustment of the tension in the springs 34.

The opposite ends of the springs have hooks that pivotally fit over a cross pin 36 fixed to mast 37. As shown the pin 36 permits pivoting of the springs during operation.

The link element 31 is pivotally mounted at its second end with a suitable pin 37 between a pair of ears formed on a yoke 38 which in turn is fixed to the upper end of the shank 12. The ears 38 are spaced apart sufficiently far to receive the link element 31, and are rigidly attached to the shank or standard 12.

As stated previously, the shank 12 is positioned between the standard plates 13, and is pivotally mounted with a pin 41 to the lower portion of the standard plates 13. The control of the position of the shank 12 about its pivot at pin 41 is therefor under the influence of the connection between the toggle link assembly 30 at the top of the shank and the pivot connection through bolt 41 to the standard plates 13. The plates 13 together form a pivoting link support member. As shown in the drawings, the springs 34 urge the link assembly 30 to be urged toward an on-line or on-center latched position wherein the pivot axis of bolt 32 will be approaching the plane defined by the pivot axes of pins 29 and 37. The toggle link elements are stopped in this latched position when a surface of a stop block 42 that is mounted between the arms 28 on bolt 43 contacts the upper surface of link element 31. The block 42 as shown has a hole for bolt 43 that is spaced at different distances from each of its four side edges so that the position at which the folding or toggle link assembly is stopped in latched position as shown in FIG. 1 can be changed by rotating the block 42 so that the stop surface of the block 42 which engages the link element 31 may be selected to hold pin 32 the desired distance from the "on-center" plane of the linkage.

As shown in FIG. 1, the springs 34 urge the arms 28 to pivot, until the stop block 42 contacts the link element 31 and at the same time therefor the shank 12 is urged about pivot bolt 41 to a position wherein the forward edge of the shank engages a stop bolt 44 that is mounted into a block 45 that in turn is fixedly attached to the upper side of the spacer 14. The spring force will urge the shank 12 against this stop bolt, and plowing forces also will tend to pivot the moldboard and share 11 about the pivot 41. The position of the stop bolt 44 determines the position of the standard plates 13 about pivot bolt 16 in working position. That is when the toggle linkage 30 is in its latched position.

As shown in FIG. 1 the standard plates 13 form a lower pivoting support link for the earth working tool (moldboard and share) and the folding or toggle linkage assembly 30 which when in latched position forms a rigid link comprising an upper pivoting support link for the earth working tool. The link assembly 30 will pivot pins 29 and 37, if it does not fold, and the plates 13 forming the lower link pivot on pins 16 and 41. The folding link assembly 30, as long as it remains latched and works as a unit, and the standard plates 13 together form a parallel linkage arrangement as shown that supports the moldboard and share 11 and permits upward movement of the share 11 against the action of springs 34 upon striking of rounded obstructions or other obstructions on the ground which creates a force tending to lift the share. The folding linkage 30 acts as a solid link between pivots 29 and 37 when floating forces are encountered and the standard plates 13 form a solid link between pivots 16 and 41. Force on the moldboard and share 11 tending to lift the moldboard and share, will permit such lifting and the two links 30 and 13 guide the shank 12 as the earth working tool lifts to clear the obstruction. The tension springs 34 are stretched and resist movement as the plow moldboard and share are raised, because the springs are placed to tend to urge the links 30 and 13 in a direction so pivots 37 and 16 will move together. As the moldboard and share lift, these pivots must separate, thereby increasing spring tension.

The dotted line position shown in FIG. 1 illustrates the position wherein the moldboard and share have moved upwardly. The shank 12 pivots about bolt 41 and moves away from the stop 44, and the moldboard and share, as shown will remain oriented with respect to a horizontal plane because of the parallel linkage action of the upper toggle linkage assembly 30, which remains latched and the lower link comprising the standard plates 13. The floating action is resisted by expansion of the springs 34 as the arms 28, forming a part of the linkage assembly 30 move upwardly about the pivot bolt 29. When the force tending to lift the moldboard and share is reduced or removed, the springs 34 will urge the links and moldboard and share back to its working position as shown in solid lines in FIG. 1.

Figure 2:
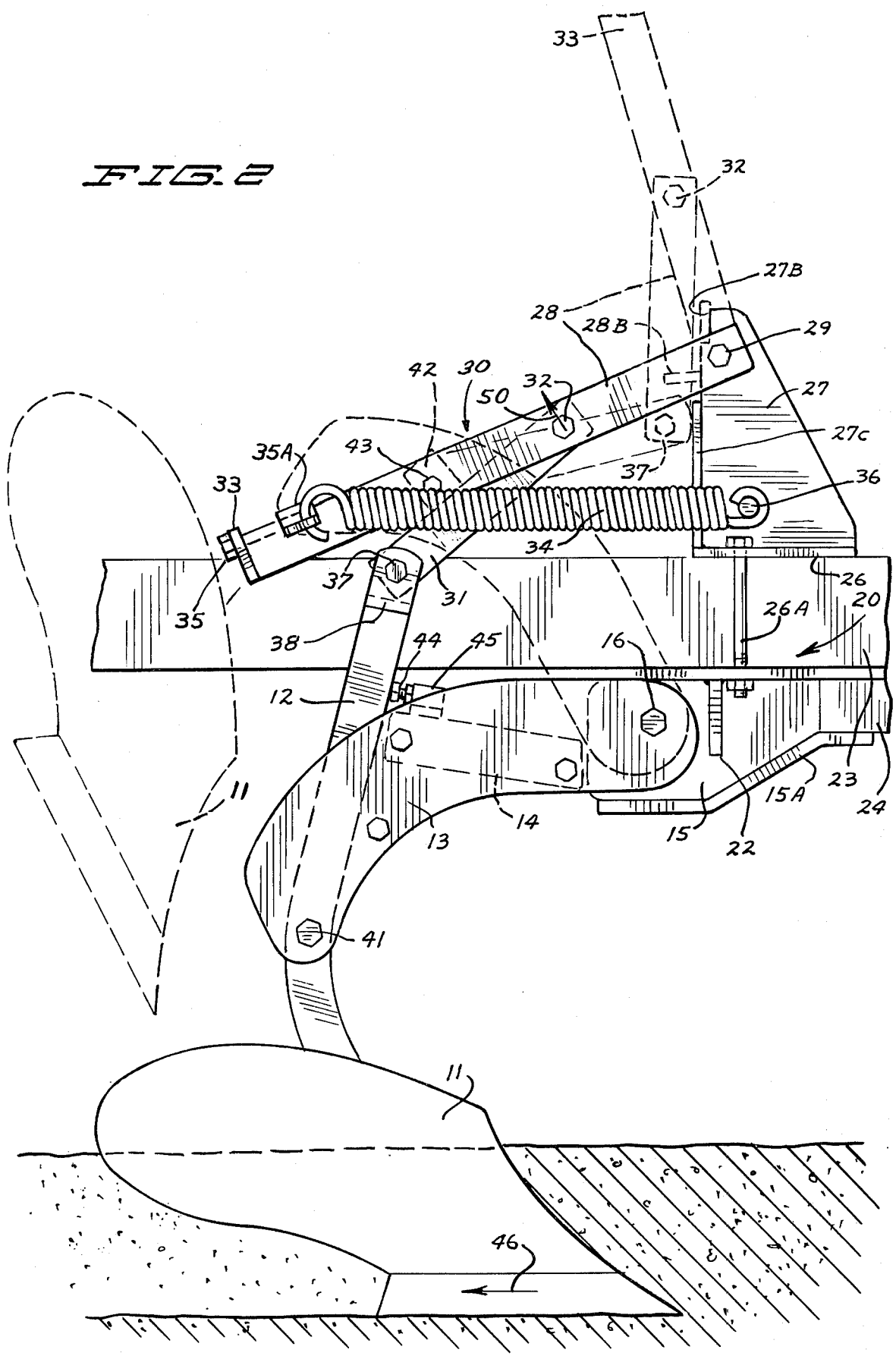
FIG. 2 is a side elevational view of the device of FIG. 1 showing a line representation of the unit in working position, and a dotted line representation of the plow in fully tripped position.
Figure 3:
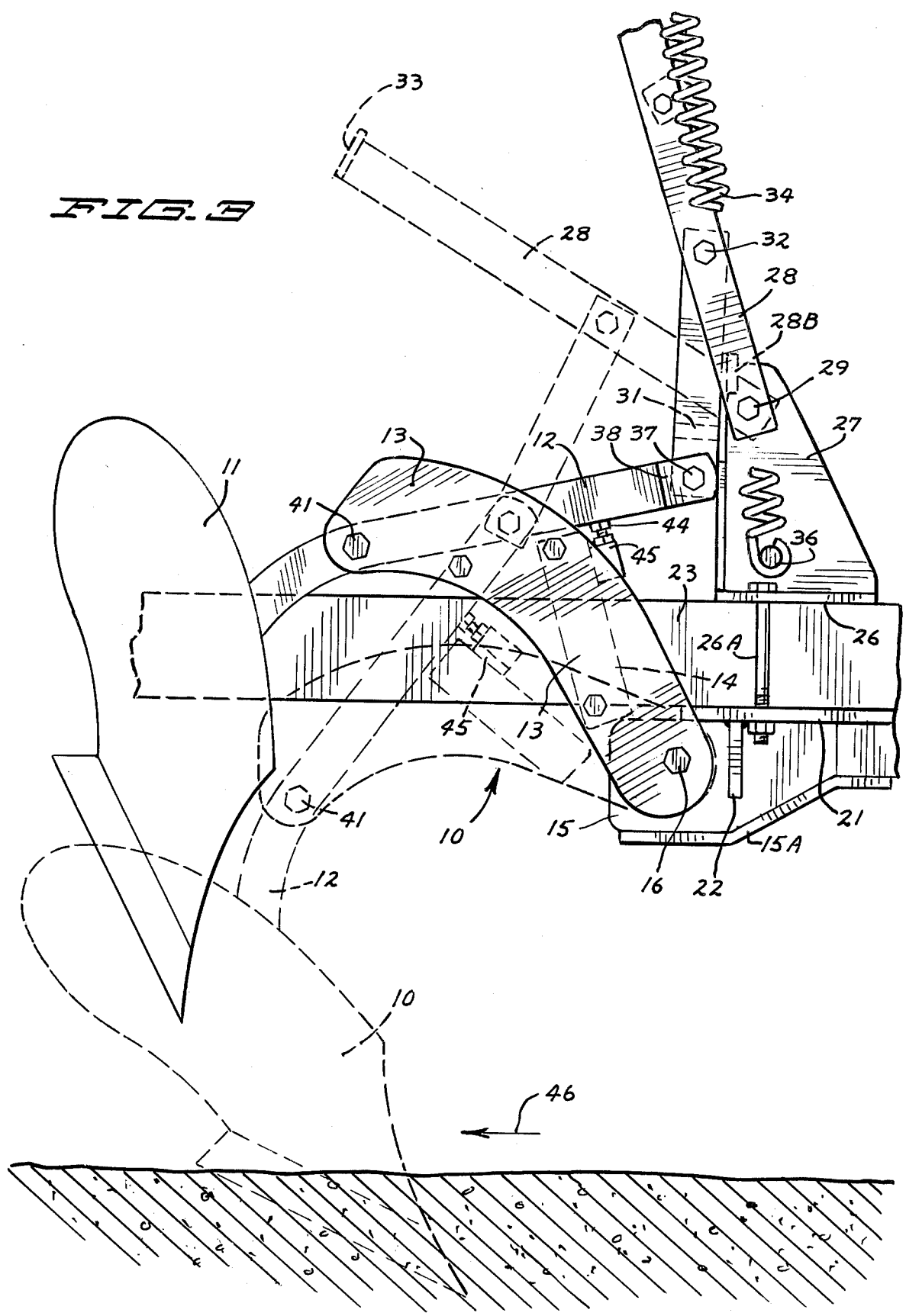
FIG. 3 is a side elevational view of the device of FIG. 1, showing the fully tripped position in solid lines and a dotted line representation of the mechanism as it is returning to working position.

In this form the plow share can rise a full eighteen inches or more without tripping the toggle linkage. Floating is guided by two pivoting links arranged as described. This floating action greatly reduces the number of times full tripping action as shown in FIGS. 2 and 3 occurs, and thus minimizes shock loads on the unit. In FIG. 2, when a plow strikes an object that hooks the moldboard and share or prevents upward movement of the plow share, such as an overhanging rock or a very high obstacle or the like, the forces will tend to cause the standard plates 13 to pivot about bolt 16, and place a compression load on the toggle linkage assembly 30 tending to cause the link assembly to release and fold. This load would include a force component acting to force the bolt 32 in direction away from the plane defined by the axis of pins 29 and 37. This force component would be represented by the arrow 50 in FIG. 2, and when the force in the direction of arrow 50 exceeds that which is exerted by the springs 34 in the position shown in FIG. 2, the link assembly 30 will fold and bolt 32 will move up in the direction as indicated by arrow 50, causing the arms 28 to pivot upwardly about the pivot axis of pin 29. The standard plates 13 will then pivot about the axis of pins 16. The springs 34 will be expanded as arms 28 pivot because mounting member 33 moves farther from pin 36 during tripping. The springs 34 will be exerting force tending to reset the toggle linkage to latched position. The link assembly fold toward the mast 27 as the plates 13 pivot about pin 16. Note that shank 12 remains against stop 44 during this tripping action. In the full tripped position the unit will assume its dotted line position as shown in FIG. 2.

The cross piece 28B between the arms 28 will engage a provided slot type notch 27B at the rear upper edge of the mast 27 and stop against this rear edge of the mast to prevent the arms 28 from pivoting far enough to cause the springs 34 to go over-center with respect to bolt 29 in the fully tripped position. In addition the link element 31 will abut against a stop 27C at the rear edge of the mast 27 as indicated in FIG. 2 to stop the linkage. The stop 27C prevents the axis of bolt 37 from going past the plane defined by the axes of pivot bolts 32 and 16. The axis of bolt 37 can come very close to this plane but if it goes past the linkage may lock in tripped position.

It can be seen that the attitude of the moldboard itself changes considerably during the tripping action when the toggle linkage 30 folds. The movement will permit the moldboard and share to clear objects which tend to hook the point of the share.

The springs 34 hold the shank 12 against the stop bolt 44 during the full pivoting movement so that the shank 12 does not pivot on bolt 41 at all, during this tripping mode.

The fully tripped position is shown in FIG. 3 in solid lines, and the dotted line position in FIG. 3 is a partially reset position after the toggle linkage has folded and the mold-board and share are returning to working position. It can also be seen here that the spring force from the springs 34 will hold the shank 12 against the stop bolt 44 during reset and thus prevent the toggle link elements 31 and 28 from resetting or being restored to their on-center or latched position before the moldboard and share engage the ground. The moldboard and share follow the same path in resetting as they did in tripping, when the toggle linkage folds for tripping action.

When the moldboard and share engage the ground as shown in the dotted line position, the forward travel of the plow will also cause a force reaction tending to pivot the moldboard and share about the pin 41 to urge the shank 12 against the stop bolt 44. The toggle linkage 30 will not be fully reset until the stop block 42 contacts the link element 31 as shown in FIGS. 1 and 2 when the plow bottom reaches its working position.

Once the folding or toggle linkage has reset, however the plow bottom will be free to float again as previously explained. If external forces tend to cause the bottom to float before it is at full depth, the toggle linkage may reset and floating action may occur at that time. However, normally the toggle linkage resets just as the plow bottom reaches full depth.

Thus, two separate types of movement are provided, each having independent movement in independent paths between working to tripped or floating position. The earth working tool generally follows the same pivotal path for resetting as it followed in tripping and the same path when it returns to working position from floating position. In other words, the full tripping action with the toggle linkage assembly 30 when it folds as shown in FIGS. 2 and 3 is separate and distinct from the movement during the floating action when the linkage assembly 30 remains unfolded.

The springs 34 exert a higher force tending to reset the linkage per degree of pivoting when the moldboard initially moves away from working position than they do when the moldboard has moved farther from working position. This aids in preventing excessive reset forces and also aids in reducing the amount of expansion of the springs that is necessary.

The plane defined by pivots 29 and 37 of the toggle linkage is spaced a substantial distance from pivot 16. This increases the effective leverage of the springs 34 tending to hold the toggle linkage latched and also for holding the upper and lower pivoting links 30 and 13 from pivoting when the moldboard and share tends to float. The increased effective leverage means that pivot 32 can be moved away from the mentioned plane to a less "on-center" position and still adequate holding force is provided. When latching of a toggle linkage is less dependent upon the "on-center" holding action, the level of force at which the linkage will fold is more reliable or repeatable, since the variable forces of friction become a less important factor.

When any obstruction is encountered the spring connection of the linkage that permits floating action also absorbs some of the jolts, even when the toggle linkage folds. Thus, the linkage connection which permits floating does provide a cushion that reduces shock loads considerably.

It should also be noted that the point of the plow share is vertically in line with pivot 16 to insure that the point will not dig into the ground. Also the pivot 29 and the pivot of bolt 36 are both close to being vertically aligned with the pivot 16 and the point of the plow share. This alignment aids in obtaining high clearance without overstressing the springs or causing links to go overcenter when they trip.

What is claimed is:

1. An earth working tool support mechanism comprising a frame, an earth working tool support shank carrying an earth working tool and extending upwardly from the earth working tool with which it is used, link means for connecting said support shank to said frame including a first link pivotally mounted to said frame about a first pivot and mounted to said support shank about a second pivot that is to the rear of and below the first pivot with the earth working tool in a working position, a second link assembly mounted to said frame about a third pivot spaced above said first pivot, and said second link assembly being pivotally mounted to said support shank at a fourth pivot spaced above the second pivot, said fourth pivot being below said third pivot with the earth working tool in a working position, said second link assembly comprising a toggle linkage having a pair of toggle elements pivotally connected together at a toggle pivot between said third and fourth pivots, and a stop to retain said toggle linkage in a latched position to form a rigid but foldable link, and a spring which exerts a load as it extends in length having a first end attached to one of said toggle elements to urge said toggle elements toward said latched position with the toggle pivot approaching a plane defined by said third and fourth pivots, said spring being mounted at a second end thereof to said frame at a location on a horizontal plane between said first and third pivots and said spring also thereby urging said first link and said second link assembly to pivot downwardly on the first and third pivots to carry an earth working tool carried by said support shank toward working position under spring force, the upper end of said support shank and said fourth pivot being free to pivot rearwardly about the second pivot to permit the earth working tool carried by the support shank to raise from its working position without tripping said toggle elements from their latched position, said toggle linkage being movable from latched position to a folded position under a predetermined compression load on said toggle linkage to permit the earth working tool carried by the support shank to move upwardly from working position while said support shank remains in one position about said second pivot, said spring being positioned to extend in length whenever the earth working tool carried by the support shank moves from its working position.

2. The earth working tool assembly of claim 1 wherein said second link assembly includes stop means preventing the linkage pivot between said linkage elements from moving toward said plane defined by the third and fourth pivots more than when in said latched position, a first of said toggle elements extending between said third pivot and the toggle pivot and being elongated to extend substantially past the toggle pivot in a direction away from the third pivot, the first end of said spring being mounted to the outwardly extending end of said first toggle element and extending generally horizontally with the earth working position.

3. The combination as specified in claim 2 and mast means comprising a portion of said frame and including means thereon defining said third pivot, and wherein said second link assembly will fold to trip and permit the earth working tool to lift from the ground, said toggle pivot being arranged such that when toggle elements move as the second link assembly folds from forces on said earth working tool said first toggle element moves upwardly about said third pivot, and said fourth pivot follows a path constrained by said first link to a position where said fourth pivot approaches but does not move past a plane defined by the axis of said first pivot and the axis of the toggle pivot.

4. The combination as specified in claim 1 wherein said spring also tends to cause pivoting of said support shank about the second pivot to tend to move the fourth pivot forwardly, and stop means positioned between said first link and said support shank to limit pivotal movement tending to move the fourth pivot forwardly to permit adjusting the working position of an earth working tool attached to said shank.

5. The combination as specified in claim 4 wherein said toggle linkage will fold under forces to cause tripping of said earth working tool and will cause said first link to pivot about said first pivot as said toggle linkage folds, and wherein said spring means urges support shank against said stop of said first link through the tripping action and also urges said support shank to remain against said stop means until the earth working tool has again entered the ground, whereby said toggle linkage does not reset to latched position until said earth working tool enters the ground.

6. An earth working implement comprising a shank support member, an earth working tool attached to said shank support at the lower end of said shank support, a frame, means to mount said shank support to said frame comprising a first nonfolding rigid link pivotally mounted to said frame about a first pivot, and having a second end of said nonfolding link pivotally mounted to said shank support about a second pivot generally to the rear of said first pivot, said shank support extending upwardly a substantial distance from said second pivot, first stop means on said first nonfolding link to limit the amount of pivotal movement of the upper portions of said shank support about said second pivot in a direction toward said first pivot, a second toggle linkage for mounting said shank support to said frame, said toggle linkage including first and second toggle elements, a first toggle element being pivotally mounted to said frame about a third pivot at a level spaced above said first pivot, said first and second toggle elements being connected together about a toggle pivot, and said second end of said toggle linkage comprising a second end of said second toggle element being mounted to the upper portions of said shank support about a fourth pivot at a level spaced above the second pivot and to the rear and below said third pivot, said toggle linkage including means to stop said toggle linkage in a latched position whereby said toggle linkage forms a rigid link until compressive forces thereon cause folding about the toggle pivot, spring means to urge said toggle linkage to said latched position and also to urge said earth working tool and shank support to pivot about the second pivot against said first stop means including an elongated spring pivotally mounted to said frame at a first end of said spring at a level between said first and third pivots, said first toggle element comprising an elongated link extending rearwardly substantially beyond the toggle pivot, and means to adjustably mount a second end of said elongated spring to an outwardly extending end of said first toggle element, said spring urging both said first link and said second toggle linkage to pivot about the first, second, third and fourth pivots to carry the earth working tool to a working position and when said toggle linkage remains in its latched position yielding to permit the first link and toggle linkage to pivot upwardly about the first and third pivots as the spring elongates, said shank support being free to pivot about the second pivot away from the first stop means to permit the earth working tool to move upwardly under forces thereon without folding said toggle linkage.

7. The combination as specified in claim 6 wherein said stop means for stopping said toggle linkage in its latched position comprising a stop block on one of said toggle elements positioned to engage a surface of the other toggle element as the toggle pivot moves toward a plane defined by the third and fourth pivots, said stop block having four planar edge surfaces engaging the other toggle element, and a mounting bolt for said stop block which is positioned a different distance from each of the four surfaces whereby rotation of said stop block will give four different stop positions of said toggle linkage.

8. The combination as specified in claim 6 wherein said toggle elements are selected in length in relation to the spacing between said first and third pivots so that as said toggle linkage moves to a folded position from its latched position, the first toggle moves upwardly about said third pivot and the fourth pivot is guided by said first link and the second toggle element so that the fourth pivot is at a level below said third pivot when the linkage is in its fully folded position.

9. The combination as specified in claim 8 wherein said spring is pivotally mounted to said frame, and the second end of the spring is connected to said first toggle element at locations so that wherein the line of action of said spring does not go overcenter with respect to said third pivot when the toggle linkage is in its fully folded position.

10. The combination as specified in claim 8 and stop means on said frame to engage a portion of said toggle linkage to prevent the fourth pivot from going overcenter with respect to a plane defined by the third pivot and the toggle pivot when the toggle pivot is in its fully folded position.

11. The combination as specified in claim 6 wherein said frame includes a beam for mounting said earth working tool, and clamp means attachable to said beam, said first pivot being on said clamp means and below said beam, and means attached to said beam defining said third pivot above said beam.

12. The combination as specified in claim 11 wherein said first link and said second linkage in latched position form generally parallel links for supporting said earth working tool.

13. The combination of claim 6 wherein said first link comprises a pair of spaced apart plates, said shank being pivotally mounted between said plates, and means between said plates to mount said stop means to said shank.

14. A support linkage for a plow comprising a frame, a moldboard and share, a support shank, means connecting said moldboard and share to the lower end of said support shank, said support linkage including a first rigid link and a second link assembly each pivotally mounted to said frame about first separate vertically spaced pivots and also each mounted to said support shank about second separate vertically spaced pivots which are below the respective pivots of the linkage to the frame with the moldboard and share in working position, stop means between the first link and said support shank to limit pivotal movement of the support shank about its pivot connection to said first link when the moldboard and share are in a working position, a spring connected directly to said frame at one end thereof, and to said second link assembly at a second end thereof, said spring acting to urge the support linkage downwardly about the first pivots between the linkage and frame to move the linkage toward a working position of said moldboard and share, said second link assembly comprising a collapsible link having two rigid elements connected together which under forces above a desired amount acting in compression along the length of said collapsible link will fold and permit pivotal movement of said first link relative to said frame while the support shank remains against said stop means as the moldboard and share move away from a working position to a tripped position and back to working position, said spring yieldably elongating as the moldboard and share move from the working position.

15. The combination of claim 14 wherein said one end of said spring is connected to said frame at a location between the vertically spaced pivots between the first and second links and said frame, and wherein said support shank is free to pivot away from said stop means under forces tending to lift said moldboard and share and tending to lift said first link and said second link assembly to cause pivoting about the pivot connections between said first link and said second link assembly and said frame.

16. An earth working tool support mechanism comprising a frame, an earth working tool support shank, and link means for connecting said support shank to said frame including a first link pivotally mounted to said frame about a first pivot and mounted to said support shank about a second pivot to the rear of the first pivot, a second link assembly mounted to said frame about a third pivot spaced above said first pivot, and being pivotally mounted to said support shank at a fourth pivot also spaced above the second pivot and below and to the rear of the third pivot, said second link assembly comprising a toggle linkage having a pair of toggle elements pivotally connected together at a toggle pivot between said third and fourth pivots, the one toggle element connected to said first pivot extending rearwardly beyond the toggle pivot to form an end portion, and an elongated bias means to exert a resilient force as it elongates having a first end mounted to the end portion of the one toggle element and having a second end mounted to said frame at location spaced from said link means to urge said toggle elements toward a latched position with the toggle pivot approaching a plane defined by said third and fourth pivots, said second end of said bias means being mounted to said frame at a location between said first and third pivots and said bias means also thereby urging said first link and said second link assembly to pivot downwardly on the first and third pivots to carry an earth working tool on the support shank toward working position, the upper end of said support shank and said fourth pivot being free to move rearwardly about said second pivot in direction away from the third pivot against the urging of said bias means as the first link pivots upwardly about the first pivot when an earth working tool carried by said support shank moves upwardly away from a working position.

17. The combination as specified in claim 16 and stop means on said frame to engage a portion of said toggle linkage to prevent the fourth pivot from going overcenter with respect to a plane defined by the third pivot and the toggle pivot when the toggle linkage moves away from latched position to a tripped position.

* * * * *

UNITED STATES PATENT AND TRADEMARK OFFICE
CERTIFICATE OF CORRECTION

PATENT NO. : 4,068,723
DATED : January 17, 1978
INVENTOR(S) : Sherman H. Quanbeck It is certified that error appears in the above-identified patent and that said Letters Patent are hereby corrected as shown below:

Column 6, line 4, "mold-board" should be--moldboard--. Column 7, line 64, (Claim 2, line 12), after "working" insert--tool in a working--. Column 8, line 23, (Claim 5, line 6), take out "of" and insert--on--; Column 8, line 23, (Claim 5, line 6), "through" should be--throughout--. Column 10, line 34, (Claim 16, line 7), "moiunted" should be--mounted--.

Signed and Sealed this

Thirtieth Day of May 1978

[SEAL]

Attest:

RUTH C. MASON
Attesting Officer

LUTRELLE F. PARKER
Acting Commissioner of Patents and Trademarks